UNITED STATES PATENT OFFICE.

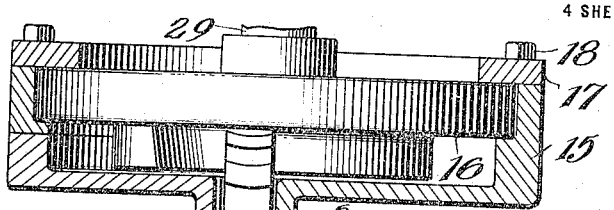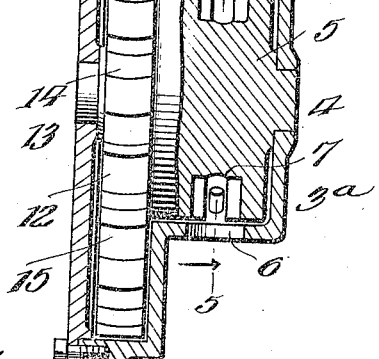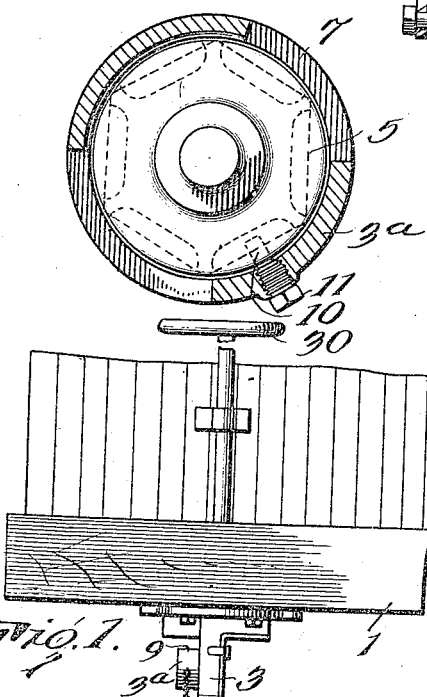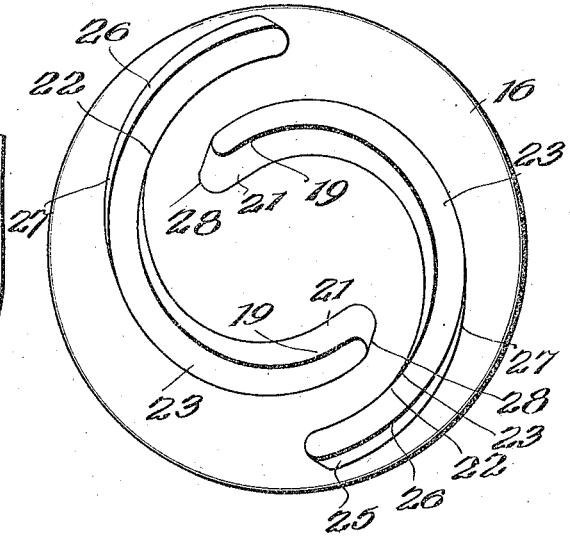

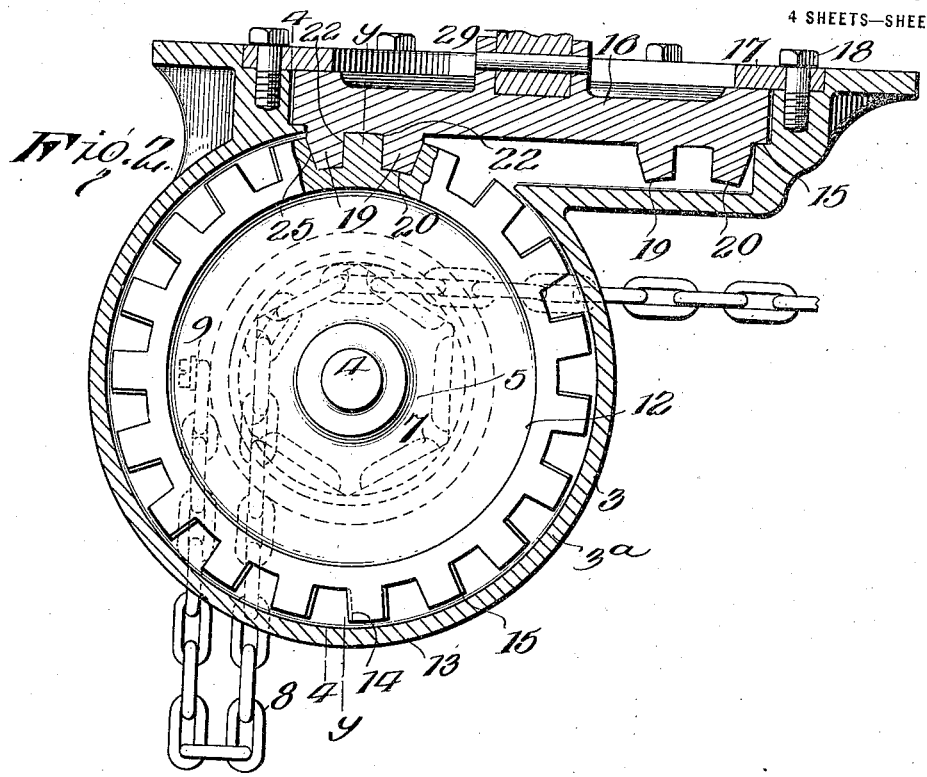
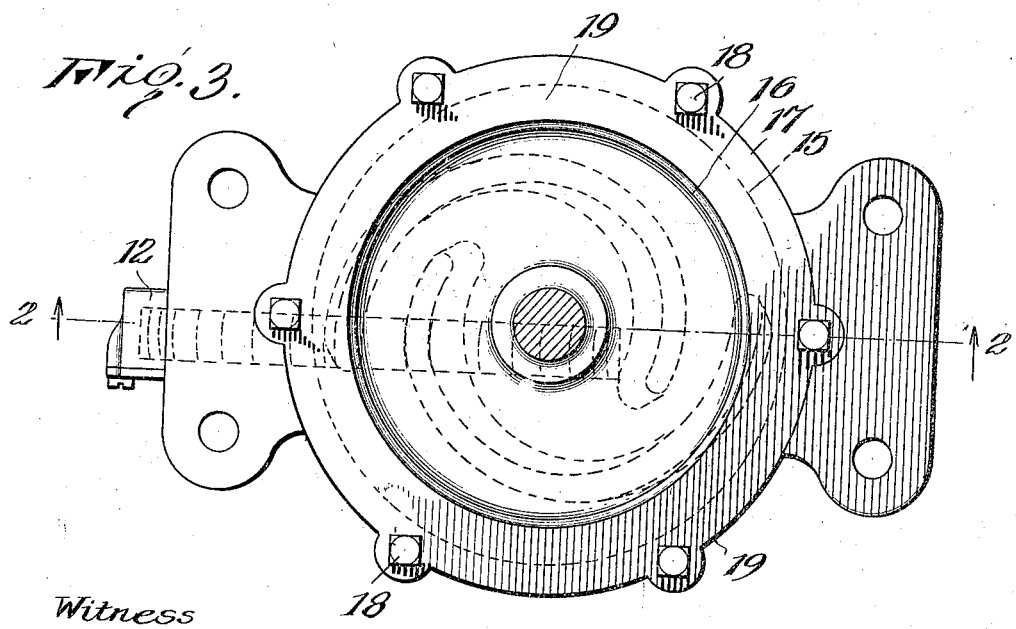

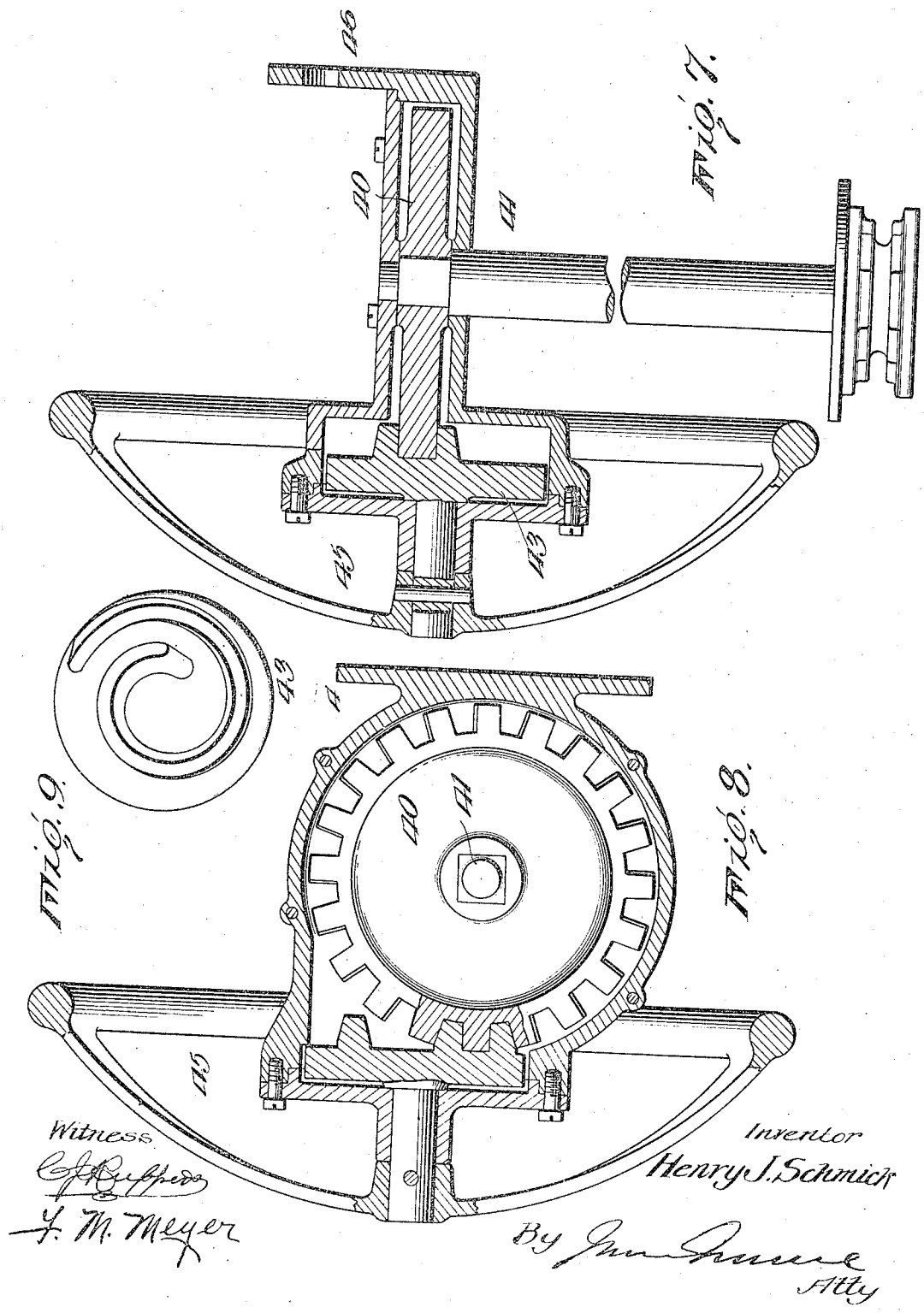

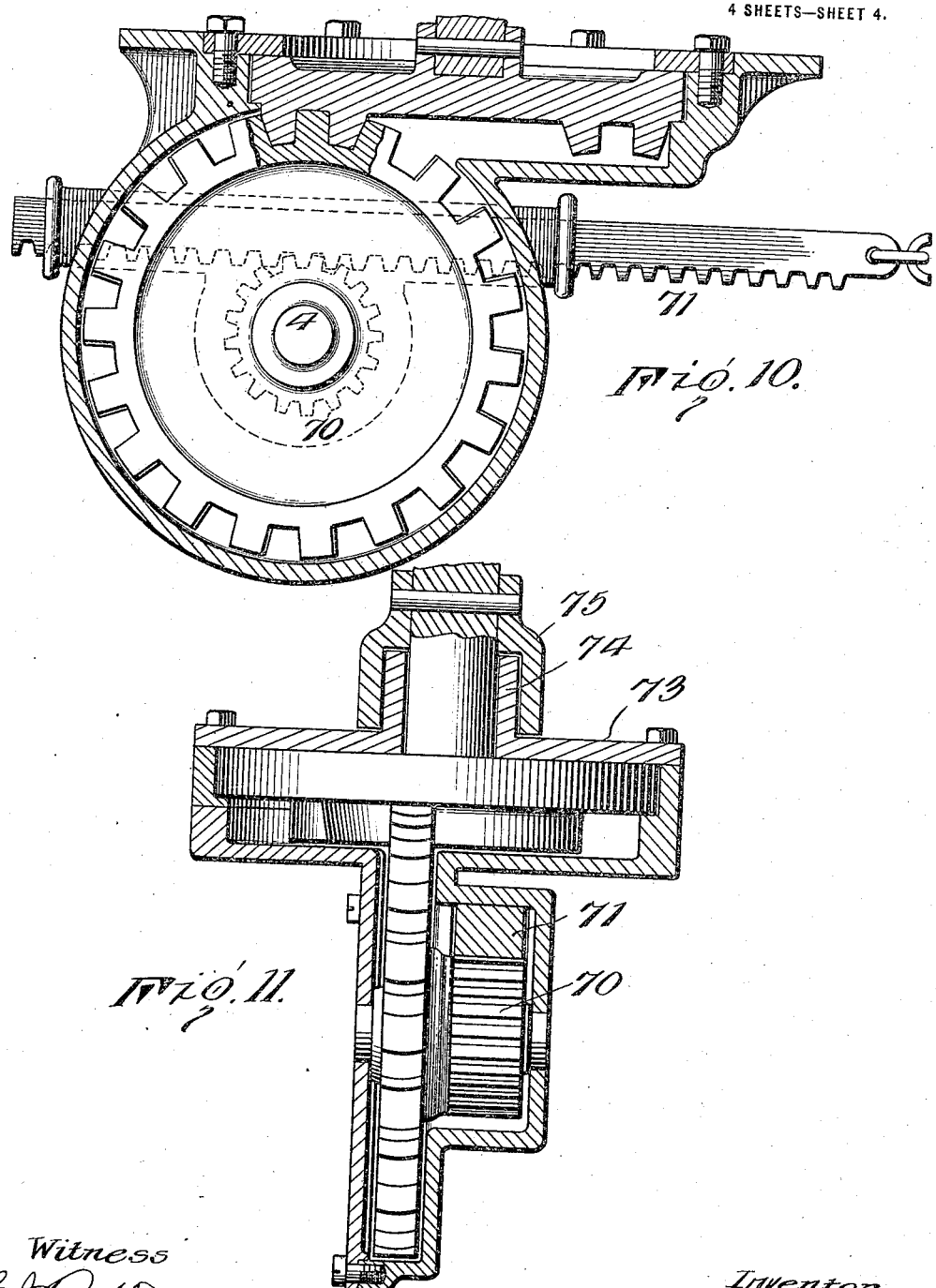

HENRY J. SCHMICK, OF LOCK HAVEN, PENNSYLVANIA.

CAR-BRAKE-OPERATING MECHANISM.

1,242,603.　　　　　Specification of Letters Patent.　　　Patented Oct. 9, 1917.

Application filed December 8, 1916. Serial No. 135,824.

*To all whom it may concern:*

Be it known that I, HENRY J. SCHMICK, a citizen of the United States, residing at Lock Haven, in the county of Clinton and State of Pennsylvania, have invented certain new and useful Improvements in Car-Brake-Operating Mechanism, of which the following is a specification.

This invention relates to improvements in brake operating mechanism.

The object of the invention is to provide mechanism so constructed and arranged that when the brakes are applied, the same operating means serve as a lock to hold the parts in set position, hence dispensing with the use of auxiliary mechanism for setting the brakes.

A further object of the invention is to provide mechanism for operating the brakes which will act positively and quickly with a minimum of power applied.

The invention also comprehends improvements in the details of construction and arrangement of parts which will be hereinafter described and particularly pointed out in the claims.

In the drawings:—

Figure 1 represents a detail front elevation illustrating the application of the invention to a freight car.

Fig. 2 is a section on the line 2—2 of Fig. 3.

Fig. 3 is a plan view of the mechanism.

Fig. 4 is a transverse section on the line 4—4 of Fig. 2.

Fig. 5 is a cross section on the line 5—5 of Fig. 4.

Fig. 6 is a face view of the cam disk and cam.

Fig. 7 is a vertical central section illustrating the application of the invention to a passenger car.

Fig. 8 is a horizontal section of the same.

Fig. 9 is a face view of a cam disk showing a single cam thereon, this form of cam being shown in Figs. 7 and 8.

Fig. 10 is a section similar to Fig. 2, but illustrating a different form of the invention.

Fig. 11 is a vertical section of the form shown in Fig. 10.

1 represents the front sill of a freight car, to the under side of which is secured a casing 2, which supports the brake operating mechanism. This casing is formed with an enlarged annular housing 3, and a smaller annular housing 3ª, in which is mounted a transverse shaft 4. On the transverse shaft, and in the smaller annular housing, is fastened a wheel 5, formed on its periphery with alternate wide chain seats 6, and narrow chain seats 7, and passing around this wheel and engaging in the seats 6 and 7, is a chain 8, one end of which is fastened at 9 to the front of housing 3ª, while the other end extends rearwardly to the brakes.

In this connection attention is called to the fact that the chain is slack between the wheel and the fastening point 9, and in all instances, whether the brakes be off or on, the chain is maintained at this point in this condition. The chain is prevented from trailing the wheel by a shoe 10, which fits in the groove of the wheel, and is formed on the end of a bolt 11.

Also secured on the shaft 5, is a gear wheel 12, the teeth of which are radially disposed, and the opposite faces of each tooth are similar. One side of each tooth is convex, as shown at 13, while the opposite side is concave, as shown at 14. While the sides of the teeth are radial, and are convex and concaved, the corners 15 are on lines parallel with a line drawn through the axis of the wheel, these limitations being essential to insure proper meshing with a cam, which will be described later on.

While the teeth are radially disposed, the walls between the teeth taper, and their bottoms are convex, as clearly shown in the drawings, this also being essential to a proper meshing relation with the cam.

In the top of the casing is an annular bearing 15, and seated in this bearing is a disk 16, held in proper position in the bearing by a plate 17, secured by bolts 18. Extending from the under side of the disk 16, is a specially formed cam or cams 19, designed to mesh with the gear wheel 12, to obtain the necessary power and motion to effect operation of the brakes, the cam being similar to the one shown in my co-pending application filed Nov. 25, 1914, Serial No. 873,929. I employ as many cams on the disks as may be necessary to govern the speed of the brakes, two being shown in Fig. 6, but one may be used, if desired, as shown in Fig. 9.

Each cam is radio-helical in general outline, and its front face is irregularly concaved to cause proper meshing with the teeth of the gear wheel, as shown at 20.

This is essential, due to the fact that the radii from the center of the disk through the cams constantly varies, while the point of meshing with the teeth of the gear is always on fixed lines. The inner end wall 21, of each cam inclines from the beginning or root of the curve, the inclination gradually diminishing and merging into a straight wall 22 at the opposite end of the curve. The approximate merging of the inclined wall into the straight wall is substantially at a point 23, intermediate the two ends of the curve, to properly mesh with the gear teeth, as will appear later. The opposite wall 24, of each cam is reversely inclined, that is, the greatest inclination is at the point of greatest radius, as shown at 25. The inclination gradually disappears at 26, and merges into a straight wall 27, near the root end of the curve.

The two cams are so disposed with relation to each other that the outer end of one overlaps the inner end of the other to form a space 28, to receive one tooth of the gear.

The axis of the disk is disposed on a plane extending substantially across one face of the gear wheel, as shown in dotted lines in Fig. 3, while the axis of the gear wheel is in line with the center of the space formed between the two outer ends of the cams, as shown by the line $y$ in Fig. 2.

A shaft 29, extends upwardly from the disk, to the top of the car, and is provided with a hand wheel 30, to afford convenient means for operating the mechanism.

To operate the brakes, the hand wheel 30 is rotated, and the cams, acting on the gear teeth, rotate the wheel and pull is exerted on the chain, the slack chain dropping in front of the casing.

Considering Fig. 2, it will be seen that the two cams fit snugly between adjacent teeth, due to the fact, first of the relative curvature of the cams, the relative disposition of the gear and the cam, and the specific cross sectional shape of the cams. Referring again to Fig. 2, it will be seen that the two straight sides 22—22 of the two cams snugly fit the opposite sides of two adjacent teeth, while the respective inclined walls 25—25 of the cams snugly engage opposite sides of the next two teeth of the gear, the curvature of the side walls of the teeth forming curved spaces to receive the cam when in meshing relation. When in this relation, the irregular concave face of the cam comes into play. That is, in any position of the cam when in mesh with the gear the convex bottom of each gear space will snugly fit against the cam. This is occasioned by reason of the fact that the line of the concavity of the cam face when on a line with the axis of the gear is identically on the same arc as the arc at the bottoms of the gear spaces, and as the radii of the cams all vary, it obviously follows that to obtain this snug relationship, the concavity of the cam face varies.

In addition to the particular construction of the various faces described, it is essential that the gear be disposed to one side of the axis of the cam, as shown and described. This permits of the cams being made on such curves that the roots or bases thereof can closely approach the center of the disk with the result that greater efficiency and power is obtained. This construction also accomplishes a most important result, in that the cams act on the teeth in lines substantially at right angles to the axis of the gear, consequently the strain when pulling on the chain, and the strain on the gear is equally distributed throughout all the parts.

The mechanism acts quickly in applying a brake, and because of the intermeshing relation of the gear and cam, the parts are automatically locked, hence dispensing with the usual pawl and ratchet mechanism. When the brake is to be released, the hand wheel is reversed, and identically the same meshing relation of the gears takes place, except of course the movement of the cam and the gear is reversed, and the slack chain is taken up.

I desire to emphasize the construction and arrangement of the parts which permit of the chain being slack at its outer end. With this arrangement, the chain can be readily adjusted at any time to suit the requirements of brake conditions, and furthermore friction between the parts is reduced to a minimum as only a part of the chain wheel engages with the chain.

In the form of the invention shown in Figs. 7 and 8, the construction previously described is altered to adapt it to passenger cars, although the same fundamental principles are employed. In these figures, 40 indicates a gear, mounted in this instance on a vertical shaft 41, provided at its lower end with a spiral or grooved portion 42, to receive the brake chain. 43 represents a cam which engages the gear, and is mounted on a shaft 44, which is horizontally disposed and extends through the casing. As many cams are employed on the disks as are necessary to govern the speed of the brakes, but the same action is obtained, irrespective to number. The outer end of the shaft 44 is provided with a hand wheel 45, so shaped as to operate around the casing to economize in space. The casing inclosing and supporting the gear and cam is provided with suitable flanges 46, by means of which it is attached to a convenient portion of the platform construction of a car.

In Figs. 10 and 11 the construction of the gears and cams are the same as in Fig. 2, but in lieu of the chain wheel on the shaft 4, I provide a pinion 70, which meshes with a rack 71, mounted to slide in the housing, and which is connected to the brakes in lieu of the chain shown in Fig. 2.

As showing one means of preventing water or dirt entering the housing and interfering with the meshing of the gear and cam, I provide a cover plate 73, shown in Fig. 11, which is provided with a bearing 74 for the cam shaft 29. Fastened on the cam shaft is a hood 75, which snugly fits around the bearing 74, which absolutely prevents the ingress of water and consequent freezing.

While I have described my improvement in connection with freight and passenger cars, it is evident it is in no way limited thereto, as it is applicable to any and all conveyances or vehicles where brake mechanism is used.

What I claim is:—

1. In brake operating mechanism, the combination of a casing having an annular bearing surface, a gear wheel mounted in the casing, the teeth of gear wheel being radially disposed, a cam element having a cam on one face thereof to engage the radial gear teeth, said cam element being supported on the annular surface in the housing, the axis of the cam element being in substantial alinement with one face of the gear wheel, a plate secured to the casing to hold the cam in mesh with the gear teeth, means for rotating the cam element, and means connected with the gear wheel for engaging a chain to operate a brake.

2. In brake operating mechanism, the combination of a gear wheel, the teeth of which on opposite faces are of the same width and are similar in shape, one edge wall of each tooth being concave and the opposite edge wall being convex, the corners of opposite faces of each tooth being parallel to a line through the axis of the gear wheel, a cam meshing with the gear wheel, said cam having one side near one end inclined in one direction and merging into a straight line, and its opposite side near the opposite other end being inclined in the opposite direction and merging into a straight line, the axis of the cam being substantially in a plane with one face of the gear wheel, means for rotating the cam, and a chain operated by the gear wheel.

3. In brake operating mechanism, the combination of a casing, a gear wheel mounted in the casing, a cam disk having its axis at right angles to the axis of the gear wheel, one face of the gear wheel being in substantial alinement with the axis of the cam disk, a cam projecting from one face of the cam disk and meshing with the teeth of the gear wheel, a chain engaging wheel rotating with the gear wheel, a chain engaging the chain wheel, and an operating hand piece for rotating the cam disk.

4. In brake operating mechanism, the combination of a casing, a gear wheel mounted in the casing, a rotary cam engaging the gear teeth and disposed at right angles to the axis of the gear wheel, a chain wheel rotatable by and with the gear wheel, a chain engaged by the chain wheel, and means for securing one end of the chain beyond the chain wheel to provide at all times slack in said chain, and means for rotating the cam.

5. In brake operating mechanism, the combination of a casing, a gear wheel mounted in the casing, a rotary cam engaging the gear teeth and disposed at right angles to the axis of the gear wheel, a chain wheel having alternate deep and shallow seats to accommodate the links of a chain, a chain engaging the chain wheel and confined by the casing, and a shoe to prevent the chain trailing the chain wheel.

6. In brake mechanism, the combination with a casing formed with a horizontal bearing, a cam disk seated on the horizontal bearing, a cap plate fitted over the cam disk to hold same in its bearing, a cam projecting from one face of the cam disk, a gear wheel mounted in the casing at right angles to the axis of the cam disk and to one side the plane of said axis, a chain wheel rotated with the gear wheel, a chain engaging the chain wheel, the front end of the chain being secured to the casing, and means for rotating the cam disk.

7. In brake operating mechanism, the combination of a casing, a gear mounted therein, a cam disposed at right angles to the gear and meshing therewith, a chain wheel rotatable by and with the gear wheel, a chain secured at one end to the casing and passing partially around the chain wheel, and means for rotating the cam.

8. In brake operating mechanism, the combination of a casing, a gear mounted therein, a cam disposed at right angles to the gear and meshing therewith, the faces of the cam being formed to snugly fit the side and bottom walls of a tooth of the gear when in meshing relation, a chain wheel rotatable by and with the gear wheel, a chain engaging the chain wheel, and means for securing the chain to prevent the free end passing over the chain wheel.

9. In brake operating mechanism, the combination of a casing, a shaft mounted therein, a gear wheel carried by the shaft the teeth of the gear wheel being radial and the opposite edge walls of each tooth being respectively convex, and concave, a brake operating element, means on the shaft for operating the brake operating element when the gear wheel is rotated, a cam element mounted in the casing, a cam extending from one face of the cam element and meshing with the gear teeth, the inner wall of the cam being inclined at the root of the curve and gradually merging into a straight surface parallel with the axis of the cam element, the outer wall of the cam at the end nearest the circumference of the element being inclined in a direction opposite to the inclination of the inner wall and merging into a straight surface parallel with the axis of the cam element, one surface of the gear wheel being in line with the axis of the cam element whereby the walls of the teeth in mesh with the cam will snugly fit the walls thereof, a cap plate on the casing to hold the cam and gear wheel in mesh, a rod extending from the cam element, and a hand operated device on the rod to rotate the latter.

10. In brake operating mechanism, the combination of a casing, a gear wheel mounted in the casing, said gear wheel having radial teeth the opposite end walls being concave and convex, an element rotatable with the gear wheel, brake actuating means engaging the element, whereby the brake is applied or released when the gear wheel is rotated, a cam element mounted in the casing and at right angles to the gear wheel one face of the gear wheel being in alinement with the axis of the cam element, a cam on one face of the cam element, said cam meshing with the radial teeth of the gear wheel, the inner wall of the cam at its root being inclined, said inner wall from the inclined position gradually merging into a straight surface at the outer end of the cam, the straight surface being parallel with the axis of the cam element, the outer wall of the cam at the root thereof being straight and parallel with the axis of the cam element and gradually merging into an inclined surface at the outer end of the cam, the radial teeth and the respective walls of the cam causing the teeth to fit snugly the contacting surfaces and force to be exerted in lines at right angles to the axis of the gear wheel, a rod extending from the cam and means on the rod to rotate same to operate the mechanism.

11. In brake operating mechanism, the combination of a casing having an annular bearing surface, a shaft mounted in the casing, a gear wheel carried by the shaft, the teeth of the gear wheel being radial and the opposite edge walls of each tooth being respectively convex and concave, a brake operating element, means on the shaft for operating the brake operating element when the gear wheel is rotated, a cam element mounted in the casing and seated against the annular bearing, said cam element having a cam extending axially from one face thereof and meshing with the gear teeth, the inner wall of the cam being inclined at the root of the curve and gradually merging into a straight line surface parallel with the axis of the cam element, the outer wall of the cam at the end nearest the edge of the cam element being inclined in a direction opposite to the inclination of the inner wall and merging into a straight surface parallel with the axis of said cam element, a cap plate on the casing to hold the cam and gear wheel in mesh, a rod extending from the cam element, and a hand operated device on the rod to rotate the latter.

In testimony whereof I affix my signature in the presence of two witnesses.

HENRY J. SCHMICK.

Witnesses:
 EMILY F. CAMP,
 JOHN IMIRIE.